United States Patent [19]
Metzger

[11] Patent Number: 6,139,059
[45] Date of Patent: Oct. 31, 2000

[54] LAP BELT DEVICE

[76] Inventor: Ray Metzger, 15559 Brookridge Blvd., Brooksville, Fla. 34613

[21] Appl. No.: 09/345,363

[22] Filed: Jul. 1, 1999

[51] Int. Cl.[7] ............................................. B60R 22/18
[52] U.S. Cl. ................................. 280/808; 280/801.1
[58] Field of Search ................................. 280/801.1, 808

[56] References Cited

U.S. PATENT DOCUMENTS

| | | | |
|---|---|---|---|
| 4,371,192 | 2/1983 | Alix | 280/808 |
| 4,607,864 | 8/1986 | Kouketsu et al. | 280/808 |
| 5,139,282 | 8/1992 | Mein | 280/808 |
| 5,160,167 | 11/1992 | Fourrey et al. | 280/808 |
| 5,340,198 | 8/1994 | Murphy et al. | 280/808 |

*Primary Examiner*—Kenneth R. Rice
*Attorney, Agent, or Firm*—Stauley M. Miller

[57] ABSTRACT

A device for introducing slack into and removing slack from a lap belt device while the device remains in its buckled configuration. The device has an inverted "T" configuration that includes a longitudinally extending first part that slidingly supports a shoulder harness and a transversely extending second part having return bends formed in its opposite ends that slidingly receives opposite ends of the shoulder harness to maintain the shoulder harness centered with respect to the first part. In a first embodiment, serrated teeth are formed in a lower end of the first part to grasp the harness and to prevent its sliding movement with respect to the first part of the device when the device is rotated from its unlocked position to its locked position. In a second embodiment, opposite ends of a rigid wire that is bent to form the device are transversely spaced apart from one another and perform the same harness-gripping function as the serrated teeth. Slack is introduced into the lap belt when the device slidingly engages the harness and slack is removed when the device is rotated into its locked position where the serrations or wire ends grasp the harness and prevent it from sliding. A simple reverse rotation unlocks the device and enables freedom of movement of the lap belt wearer.

5 Claims, 5 Drawing Sheets

LAP BELT DEVICE

BACKGROUND OF THE INVENTION

1. Field of the Invention

This invention relates, generally, to lap and shoulder harnesses of the type used in motor vehicles. More particularly, it relates to a device that enables a user to move freely when strapped in without disabling the automatic locking function of the belt.

2. Description of the Prior Art

Seat belt use is mandatory in most states. However, some designs are troublesome in that they prevent an occupant of a vehicle from moving freely. For example, a driver approaching a toll booth may need to remove a wallet from a rear pants pocket; some seat belt designs will prevent the driver from leaning forward to perform the wallet-removal process. As a result, the driver must disable the restraint system by uncoupling the belt. If the driver then forgets to re-buckle-up, the risk factor of the trip increases.

Even if a driver never forgets to re-buckle the restraint system, it is still problematic that the system needs to be continually un-hooked and re-fastened at each toll booth or other such place where a pass or the like must be exhibited.

What is needed, then, is a device that enables a seat belt wearer to introduce some slack into a tight harness to enable moving around as needed from time to time, without disabling the automatic locking system of the factory-built restraint system. When the driver needs to move, a first simple motion should be all that is required to introduce slack into the system to enable the movement and a second simple motion should be all that is required to return the shoulder belt to its no-slack position. The device should not require the user to unfasten the seat belt itself.

However, in view of the art considered as a whole at the time the present invention was made, it was not obvious to those of ordinary skill in this art how to provide the needed apparatus.

SUMMARY OF THE INVENTION

The long-standing but heretofore unfulfilled need for an apparatus that overcomes the limitations of the prior art is now met by a new, useful, and nonobvious invention.

More particularly, the present invention is a device that slideably engages a seat belt shoulder harness when unlocked to enable the introduction of slack into the harness without unbuckling the harness and that grasps the seat belt shoulder harness when locked to remove the slack.

The novel device includes a base member having a longitudinally extending first part and a transversely extending second part. A return bend is formed in each end of the transversely extending second part, and a belt-gripping means is formed in a first end of the longitudinally extending first part.

The longitudinally extending part is adapted to underlie and slidingly support the seat belt shoulder harness. Each return bend is adapted to slidingly receive opposite longitudinally extending edges of the seat belt shoulder harness. The return bends serve to maintain the harness in centered relation relative to the longitudinally extending first part of the novel device.

The base member has a first, unlocked configuration where it forms an acute angle with a downwardly extending section of the seat belt shoulder harness, and has a second, locked configuration where it forms an obtuse angle with the downwardly extending section of the seat belt shoulder harness.

The belt-gripping means prevents sliding movement of the seat belt shoulder harness with respect to the base member when the base member is in its locked configuration.

In a first embodiment, the base member is formed of a flat, rigid material including a longitudinally extending first part and a transversely extending second part. The return bends are formed in opposite ends of the transversely extending part and the belt-gripping means is a serrated edge formed in a first end of the longitudinally extending first part.

In a second embodiment, the base member is formed of a rigid wire that is bent to form a longitudinally extending first section and a second section, transversely disposed to the first section, is formed by a pair of transversely extending return bends. The belt-gripping means is formed by opposite ends of the rigid wire. The opposite ends are longitudinally disposed and are transversely spaced apart with respect to one another.

In a third embodiment of restricter device 10, wings 20 have their inward ends angled 21 and 21a instead of vertical to aid in preventing the belt from slipping out from the device.

A primary object of this invention is to provide a device that introduces slack into a lap belt system by a first simple motion and that removes the slack by a second simple motion.

Another important object is to provide a device that is usable with different kinds of factory-built restraint systems that allows a user to bend forward as needed from time to time without removing the restraint system.

These and other important objects, features, and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
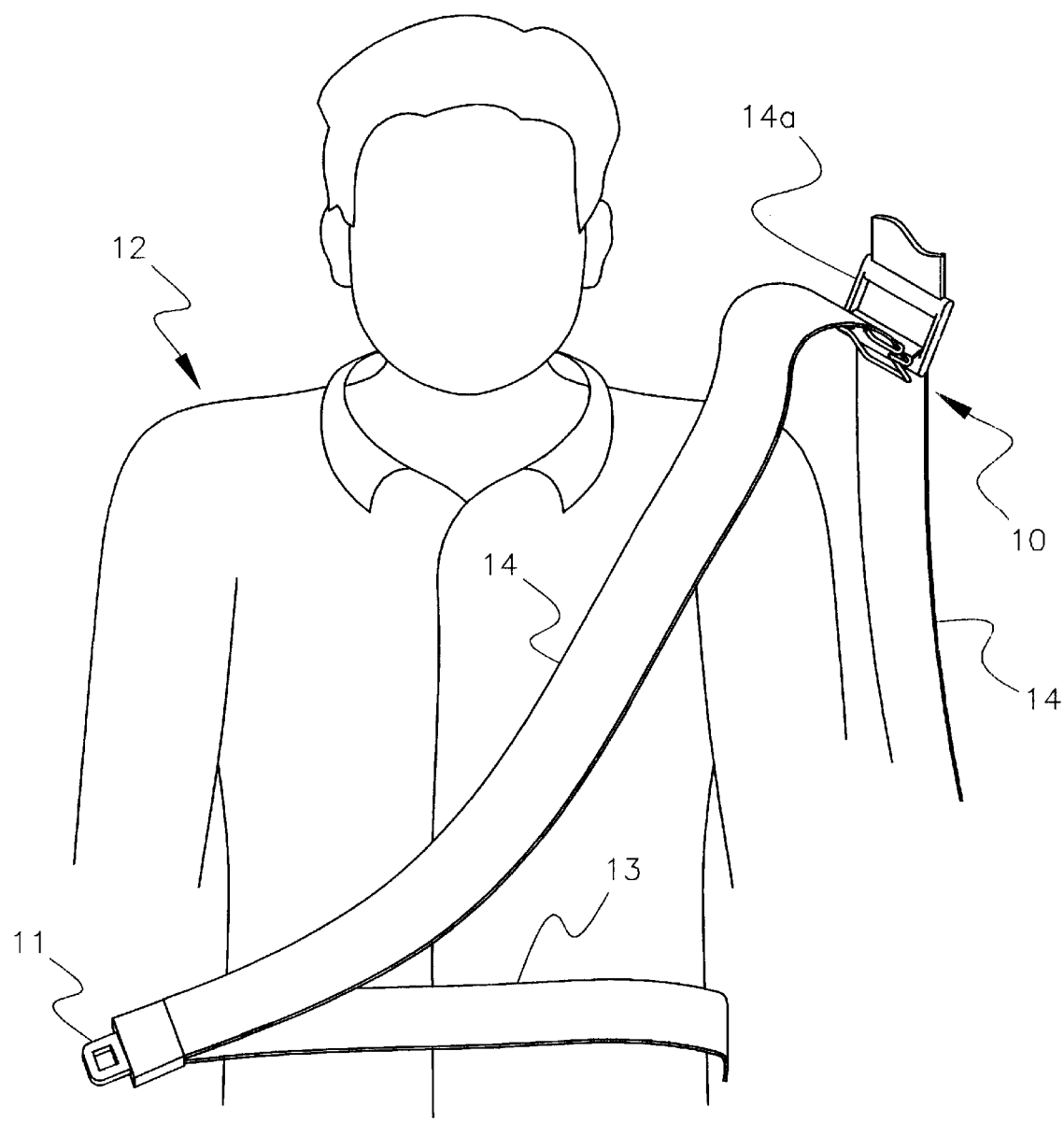
FIG. 1 is a front elevational view of a vehicle passenger seated in a vehicle equipped with a factory-built restraint system that has been modified by addition of the novel device.

Referring now to FIG. 1, it will there be seen that the novel device is denoted as a whole by the reference numeral 10.

A safety belt user 12 is seated in a motor vehicle seat, not shown, and is protected from forward travel in the event of a sudden stop by a lap belt 13 and a shoulder harness 14 releasably attached to a buckle 11. Member 14A is a factory-provided support and guide for shoulder harness 14, i.e., harness 14 extends upwardly from buckle 11 to support member 14A and then extends downwardly from said support member 14A to a factory-built anchor mechanism near the floor of the vehicle, not shown. The anchor mechanism, not shown, includes a retracting spring, not shown, that maintains belt 14 under tension.

Figure 2:
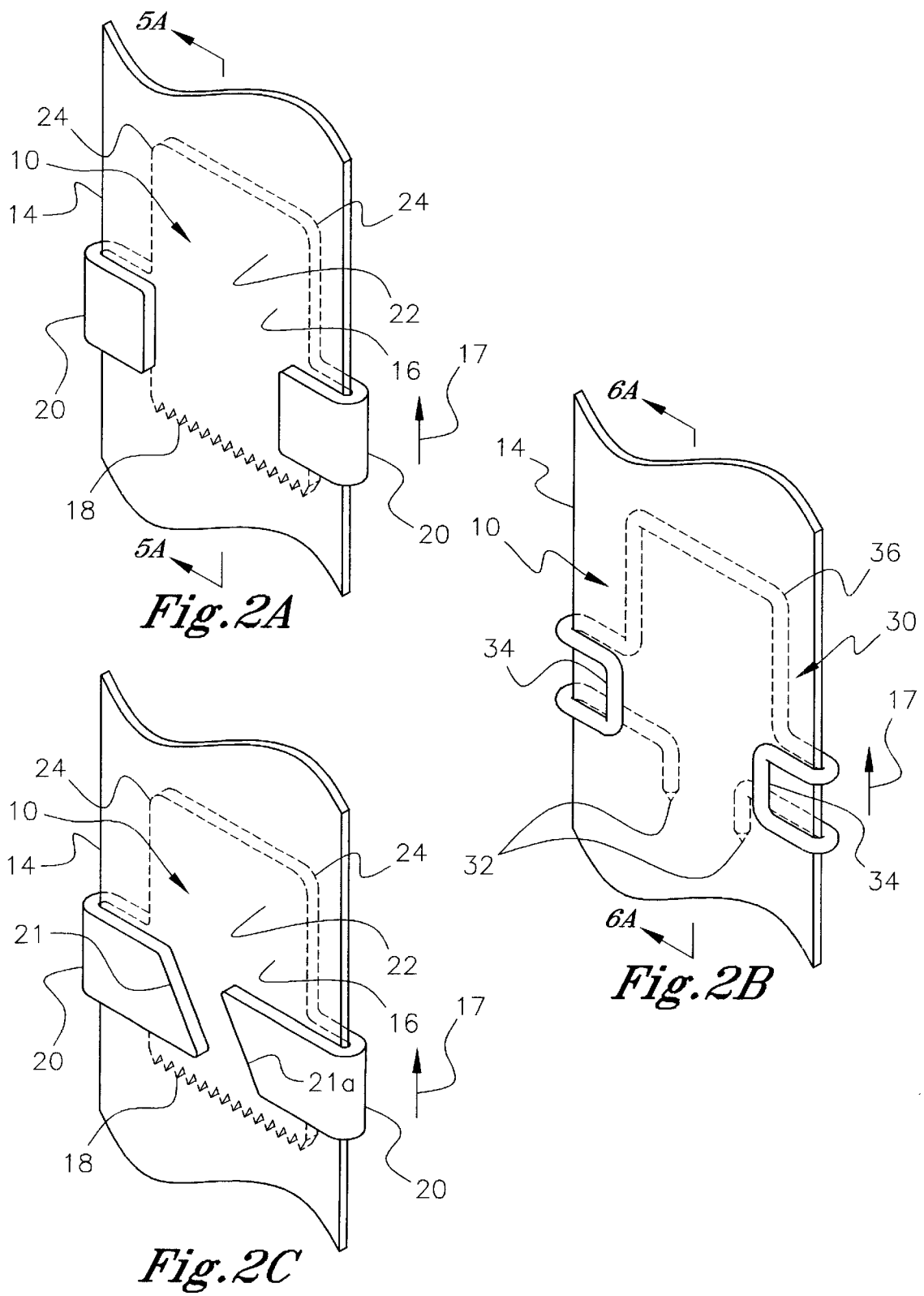
FIG. 2A is a perspective view of a first embodiment of the novel device.
FIG. 2B is a perspective view of a second embodiment of the novel device.
FIG. 2C is a perspective view of a third embodiment of the novel device.

A first embodiment of the novel restricter device 10 of this invention is shown in greater detail in FIG. 2A. Device 10, in this embodiment, is formed initially by a flat piece of rigid material 16 having the general configuration of an inverted "T" and having a serrated bottom edge 18. The transversely extending part of the inverted "T" has a return bend formed in each of its opposite ends to form wings 20, 20 that are transversely spaced apart from one another and which slidingly admit the respective opposite longitudinal edges of shoulder harness 14 therebetween when said harness 14 overlies longitudinally-extending part 22 of device 10. Part 22 has rounded corners 24. The return bends serve to maintain harness 14 centered with respect to part 22.

FIG. 2B depicts a second alternative embodiment of restricter device 10. It performs the same function as the first embodiment but has a different structure. It is formed of a rigid wire 30 that is bent to form the outline of the first embodiment. It has a first end 32 and a second end, also denoted 32, transversely spaced apart therefrom. Ends 32 perform the same function of serrated edge 18 of the first embodiment, as will become clear as this description proceeds. The path of travel of the bent wire describes two transversely spaced apart pairs of longitudinally spaced apart return bends, collectively denoted 34, and further describes longitudinally extending part 36. As in the first embodiment, harness 14 overlies part 36 and return bends 34 maintain said harness in centered relation to said part 36.

FIG. 2C depicts a third alternative embodiment of restricter device 10. It performs the same function as the first embodiment but has a different structure of wings 20. As can be seen in FIG. 2C, wings 20 have their inward ends angled 21 and 21a instead of vertical to aid in preventing the belt from slipping out from the device.

Figure 3:
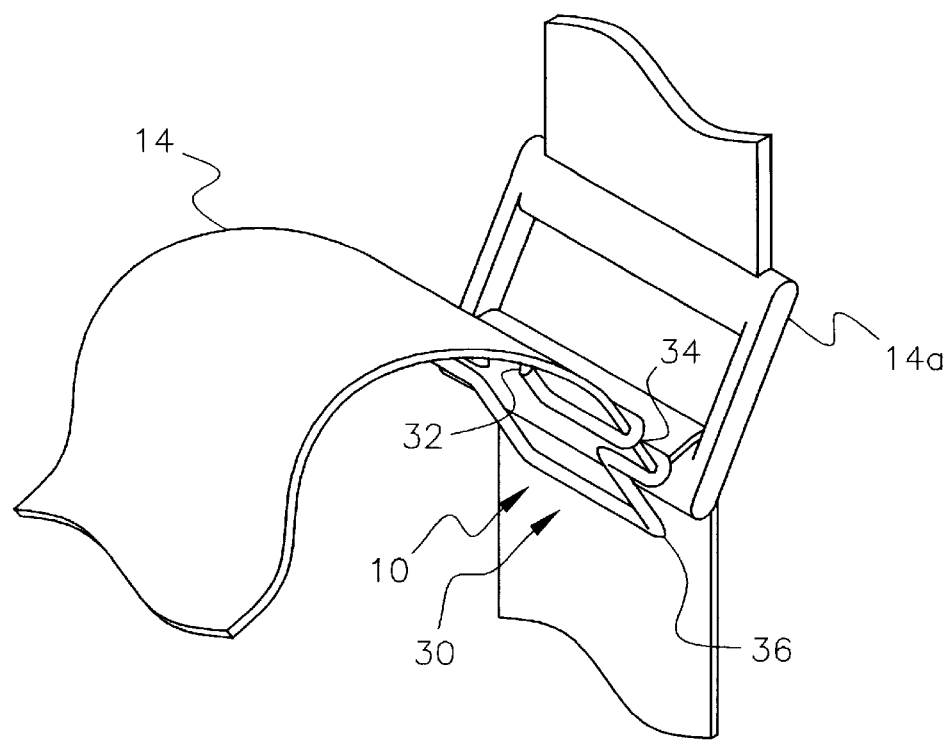
FIG. 3 is a perspective view of the second embodiment of the device when in its locked mode and when in use in conjunction with a first type of factory-built suspension system.

FIG. 3 depicts the embodiment of FIG. 2B when in its locked mode, hereinafter disclosed, and when used with a factory-built upper harness support 14A of a first well-known type.

Figure 4:
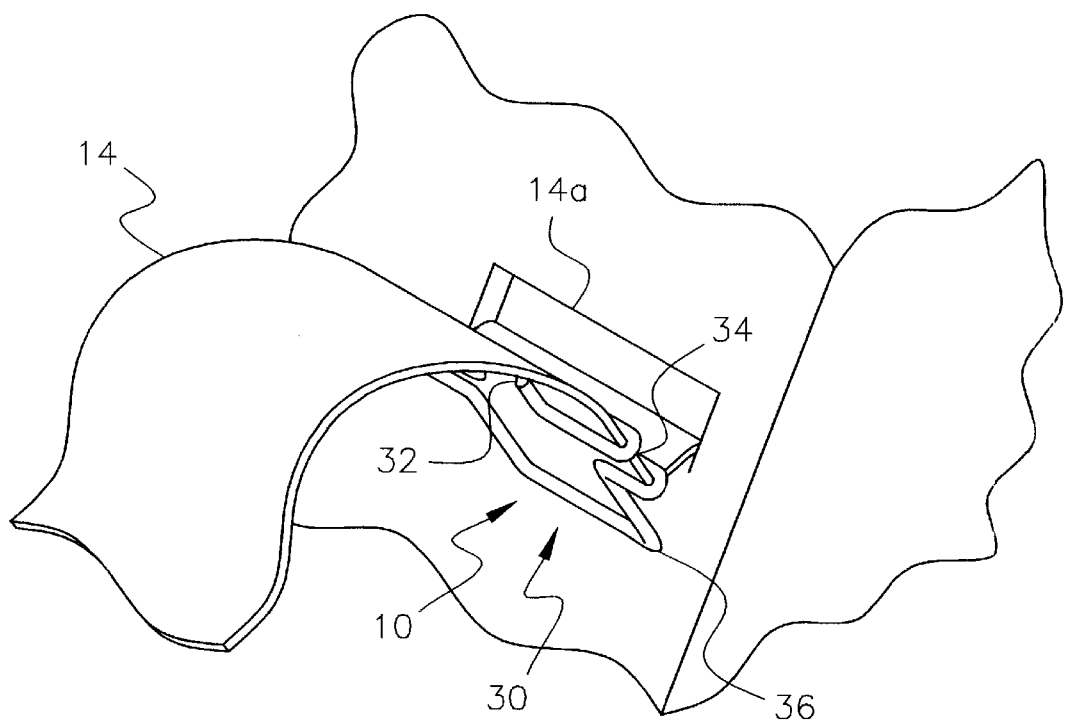
FIG. 4 is a perspective view of the second embodiment of the device when in its locked mode and when in use in conjunction with a second type of factory-built suspension system.

FIG. 4 depicts the embodiment of FIG. 2B when in its locked mode and when used with a factory-built upper harness support 14A of a second well-known type. Therefore, the invention meets the important objective of being usable with different types of factory-built restraint systems.

Figure 5A:
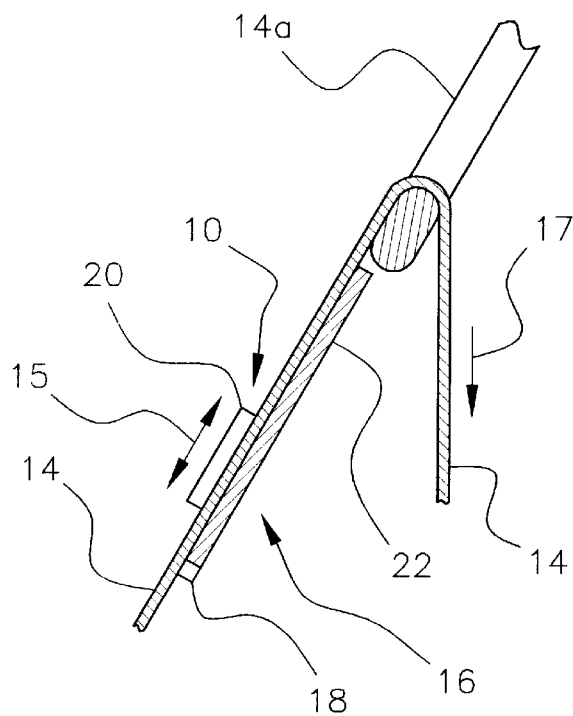
FIG. 5A depicts the first embodiment of the invention when in its sliding mode.

FIG. 5A depicts the embodiment of FIG. 2A when in its unlocked mode. Note that the upwardly-extending part of shoulder harness 14 rides over serrations 18 and is supported near factory-built support 14A by vertically extending part 22. Belt 14 is centered atop said part 22 by return bends 20, it being understood that said return bends do not engage said belt 14. Double-headed directional arrow 15 indicates that belt 14 is free to slide with respect to restricter device 10 in either direction. Single-headed directional arrow 17 indicates the direction of bias provided by the retracting spring, not shown, in the anchor mechanism, not shown. Accordingly, when device 10 is in the configuration of FIG. 5A, there is sufficient slack in harness 14 to enable wearer 12 to move relatively freely without unbuckling buckle 11.

Figure 5B:
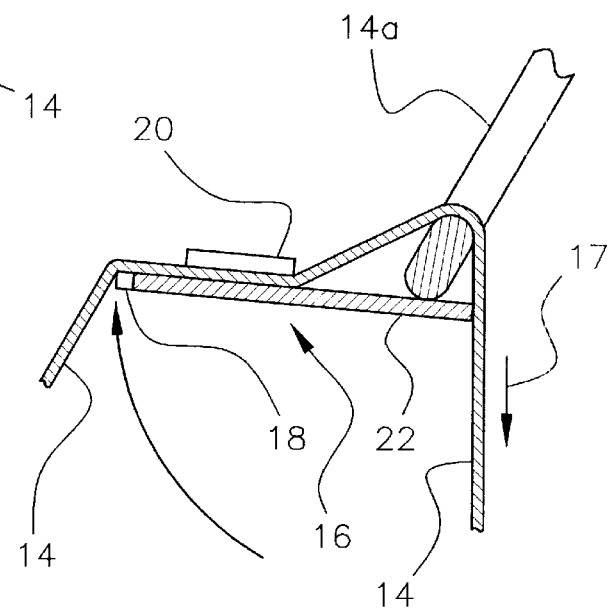
FIG. 5B depicts said first embodiment when being moved into its locked configuration.
Figure 5C:
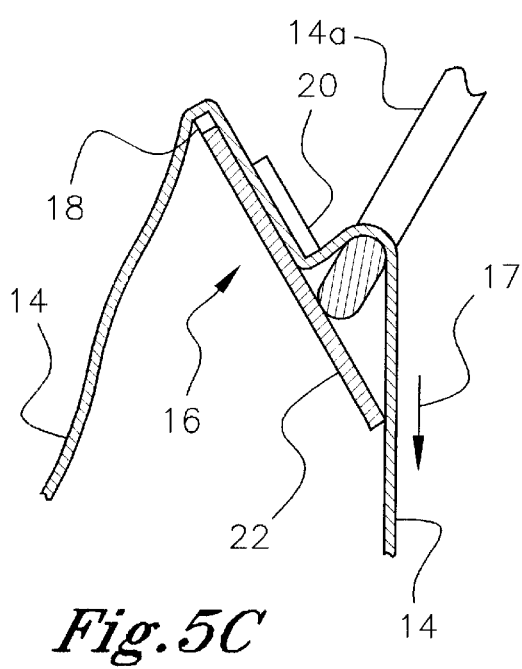
FIG. 5C depicts said first embodiment when in its fully locked configuration.

When individual 12 no longer requires the freedom of movement provided by novel restricter device 10, said device is manually rotated by said individual into its FIG. 5C position, passing through the position of FIG. 5B which roughly depicts the half-way position between the open or slack-providing and closed or slack-removing positions of FIGS. 5A and 5C, respectively. The arcuate arrow in FIG. 5B indicates the rotational movement.

Figure 6A:
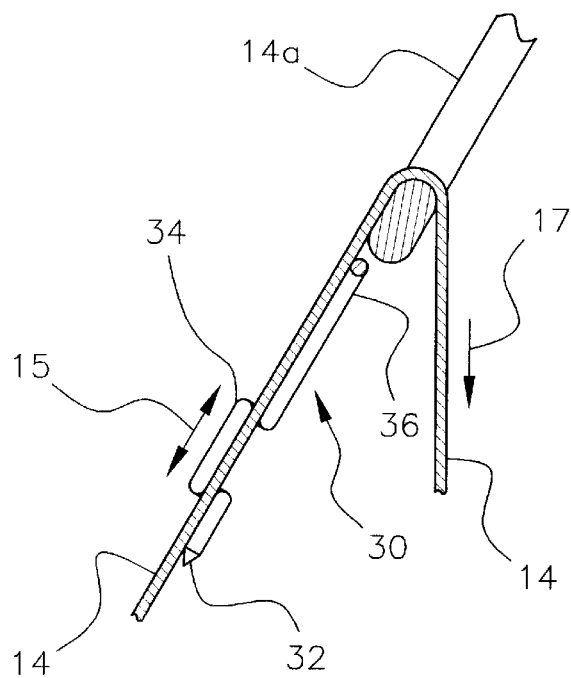
FIG. 6A depicts the second embodiment of the invention when in its sliding mode.

Similarly, when the second embodiment of novel device 10 is in the configuration of FIG. 6A, a restrained individual may lean forward, due to the slack provided.

Figure 6B:
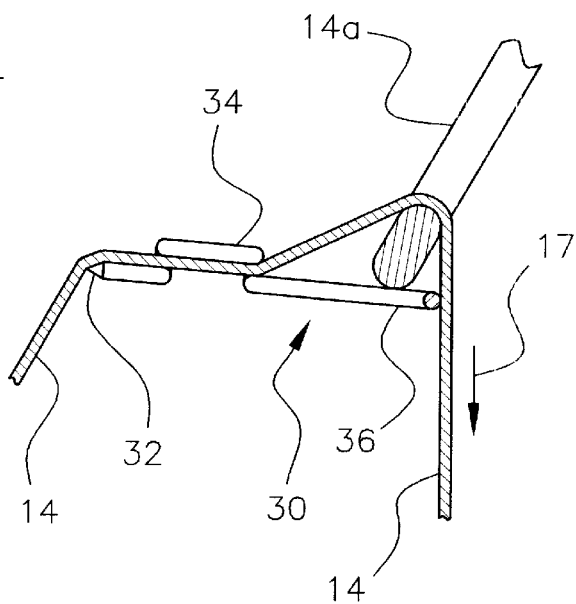
FIG. 6B depicts said second embodiment when being moved into its locked configuration.
Figure 6C:
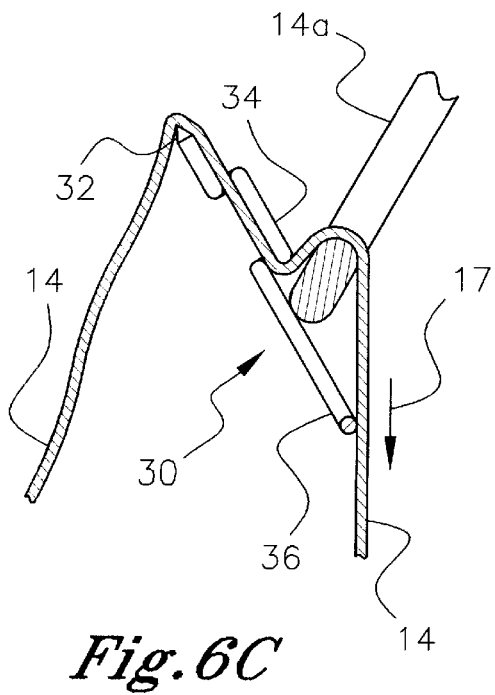
FIG. 6C depicts said second embodiment when in its fully locked configuration.

When individual 12 no longer requires the freedom of movement provided by the second embodiment of novel restricter device 10, said device is rotated by said individual into its FIG. 6C position, passing through the position of FIG. 6B which roughly depicts the half-way position between the open and closed positions of FIGS. 6A and 6C, respectively.

Note in FIG. 5C that serrated teeth 18 bite into belt 14, and in FIG. 6C that ends 32, 32 of rigid wire 30 perform the same function. This biting action prevents sliding movement of belt 14 with respect to restricter device 16 or 30 when said devices are in their respective locked positions.

Belt 14 is pulled downwardly by individual 12 to unlock restricter device 10. From its FIG. 5C or FIG. 6C position, device 10 passes through its FIG. 5B or FIG. 6B position until it attains its FIG. 5A or FIG. 6A position, respectively.

When unlocked, the upwardly extending part of harness 14 is disposed substantially parallel to restricter device 10, as depicted in FIGS. 5A and 6A. When locked, said upwardly extending part reverses direction and extends downwardly as it passes over serrations 18 or pointed ends 32, as depicted in FIGS. 5C and 6C.

Moreover, when unlocked, restricter device 10 forms an acute angle with respect to the downwardly extending part of harness 14, as depicted in FIGS. 5A and 6A. When locked, restricter device 10 forms an obtuse angle with said downwardly extending part, as depicted in FIGS. 5C and 6C.

When unlocked, the upwardly extending part of harness 14 is disposed substantially parallel to restricter device 10, as depicted in FIGS. 5A and 6A. When locked, said upwardly extending part reverses direction and extends downwardly as it passes over serrations 18 or wire ends 32, as depicted in FIGS. 5C and 6C.

This locking and unlocking mechanism is similar to a cam-over-center construction in that device 10 will remain in its FIG. 5C or FIG. 6C position until shoulder harness 14 is pulled downwardly. In other words, the respective positions depicted in FIGS. 5C and 6C are stable, due to the cam over center structure of the novel restricter.

It will thus be seen that the objects set forth above, and those made apparent from the foregoing description, are efficiently attained. Since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A device that slideably engages a seat belt shoulder harness when unlocked to enable the introduction of slack into said harness without unbuckling the harness and that grasps said seat belt shoulder harness when locked to remove said slack, comprising:

a base member having a longitudinally extending part and a transversely extending part;

a return bend formed in each end of said transversely extending part;

a belt-gripping means formed in a first end of said longitudinally extending part;

said longitudinally extending part adapted to underlie and slidingly support said seat belt shoulder harness;

each return bend adapted to slidingly receive opposite longitudinally extending edges of said seat belt shoulder harness and to maintain said harness in centered relation relative to said longitudinally extending part;

said base member having a first, unlocked configuration where it forms an acute angle with a downwardly extending section of said seat belt shoulder harness;

said base member having a second, locked configuration where it forms an obtuse angle with said downwardly extending section of said seat belt shoulder harness;

said belt-gripping means preventing sliding movement of said seat belt shoulder harness with respect to said base member when said base member is in said locked configuration.

2. The device of claim 1, wherein said base member is formed of a flat, rigid material including a longitudinally extending first part and a transversely extending second part, and wherein said return bends are formed in opposite ends of said transversely extending part.

3. The device of claim 2, wherein said belt-gripping means is a serrated edge formed in a first end of said longitudinally extending first part.

4. The device of claim 1, wherein said base member is formed of a rigid wire that is bent to form a longitudinally extending first section and wherein a second section, transversely disposed to said first section, is formed by a pair of transversely extending return bends.

5. The device of claim 4, wherein said belt-gripping means is formed by opposite ends of said rigid wire, said opposite ends being longitudinally disposed and being transversely spaced apart with respect to one another.

* * * * *